United States Patent [19]

Sprague

[11] 3,859,481

[45] Jan. 7, 1975

[54] TELESCOPING POWER SUPPORT

[76] Inventor: Stephen B. Sprague, Copa Ladeene Apt. 244, 23920 Anza Ave., Torrance, Calif. 90505

[22] Filed: Oct. 29, 1973

[21] Appl. No.: 410,908

[52] U.S. Cl.............. 191/12 R, 14/71, 244/114 R
[51] Int. Cl............................................. H02g 11/00
[58] Field of Search........... 191/2, 12 R; 244/114 R; 296/28 AL; 14/71

[56] References Cited
UNITED STATES PATENTS

| | | | |
|---|---|---|---|
| 2,205,665 | 6/1940 | Peters................................. | 191/12 R |
| 2,858,381 | 10/1958 | Goldberg.......................... | 191/12 R |
| 3,646,282 | 2/1972 | Herring............................. | 191/12 R |
| 3,722,017 | 3/1973 | Gacs...................................... | 14/71 |

*Primary Examiner*—M. Henson Wood, Jr.
*Assistant Examiner*—D. W. Keen
*Attorney, Agent, or Firm*—Ben J. Chromy

[57] ABSTRACT

Apparatus for supporting an electric cable, hose or the like along an extendable structure such as a walkway leading to a parked aircraft from an airport terminal building. An embodiment of this apparatus includes several telescoping tubular members with slidable cable supporting trolleys suspended therefrom. These telescoping members and the cable supporting trolleys are constructed so that they do not interfere with each other when the telescoping members are drawn into the larger ones thereof and the cable supported thereby is folded and suspended therefrom.

A modified embodiment of this invention includes a tag line that is held under tension and is supported on the side of the telescoping structure with the cable or hose suspended therefrom by trolleys. Tension and take-up of the tag line is provided by an automatic reeling and dispensing apparatus that is electrically controlled.

8 Claims, 8 Drawing Figures

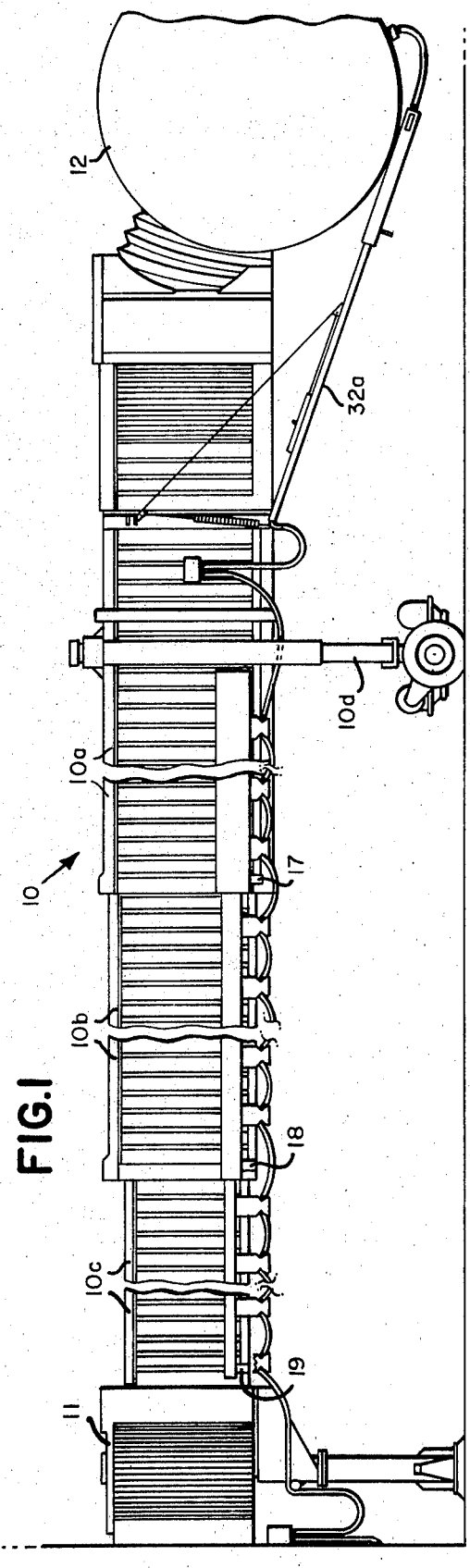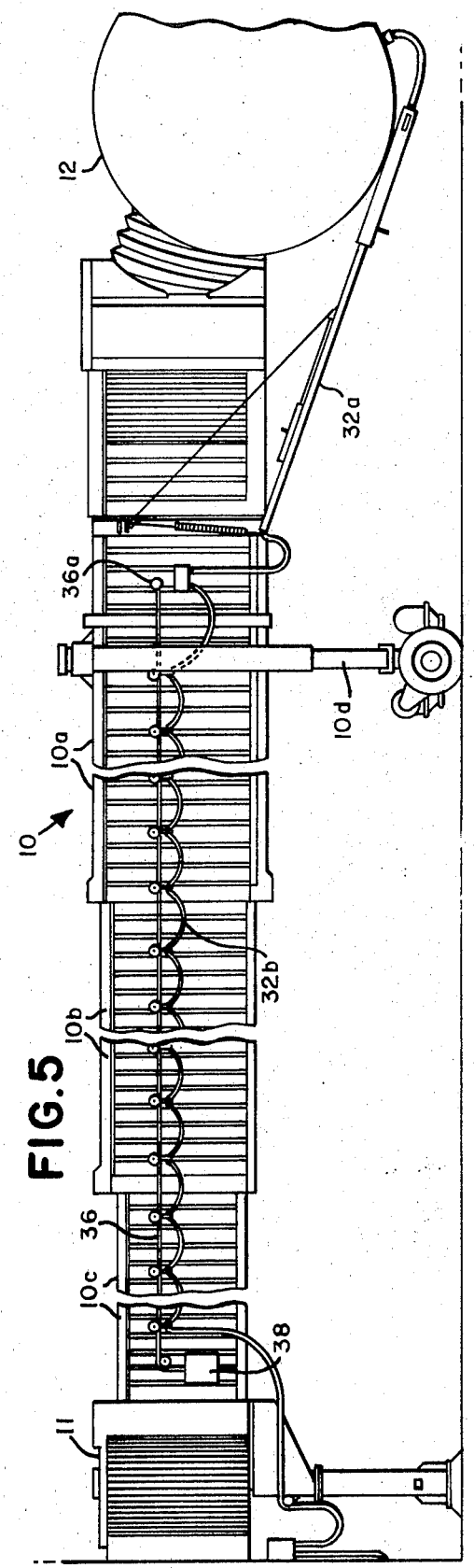

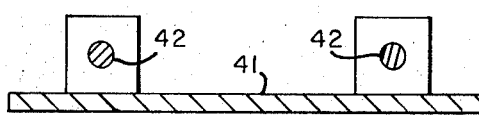
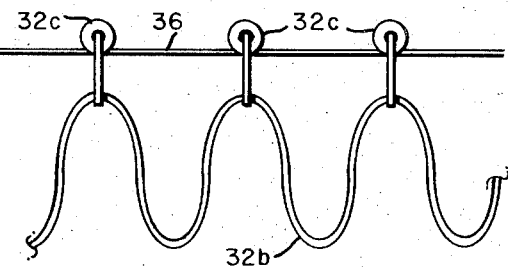
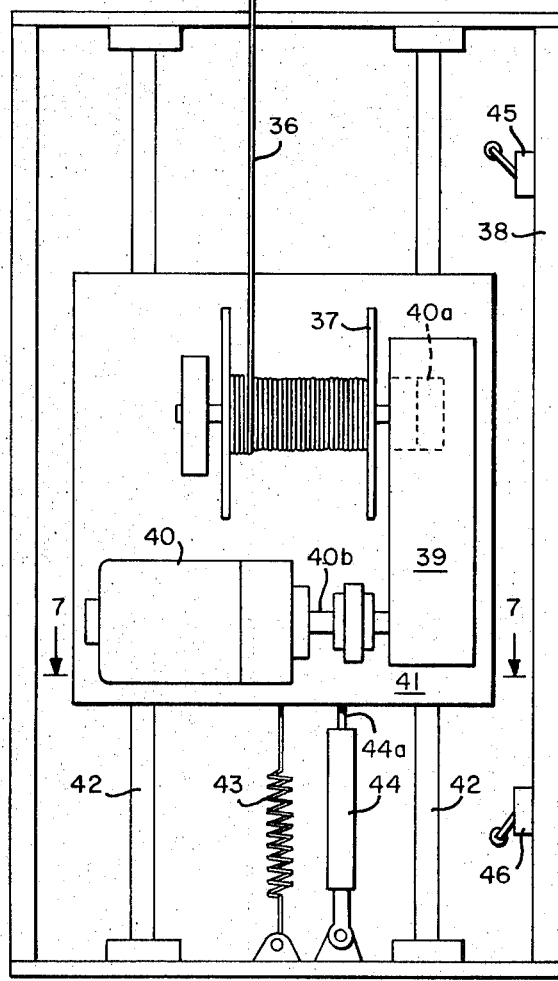
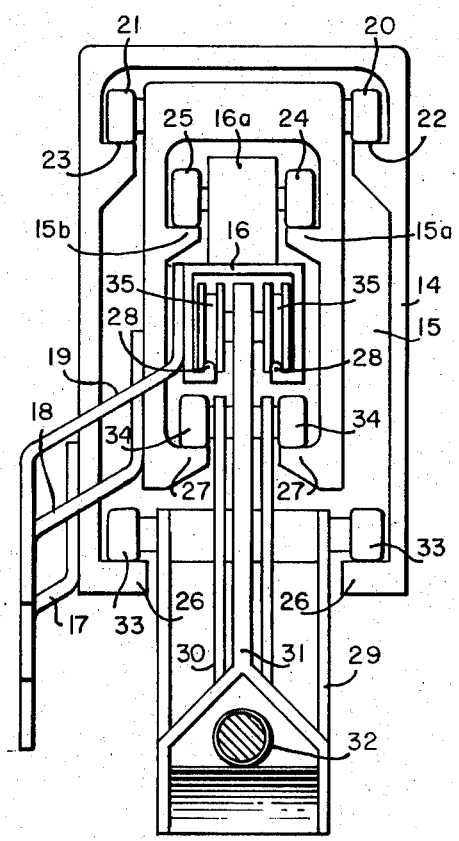

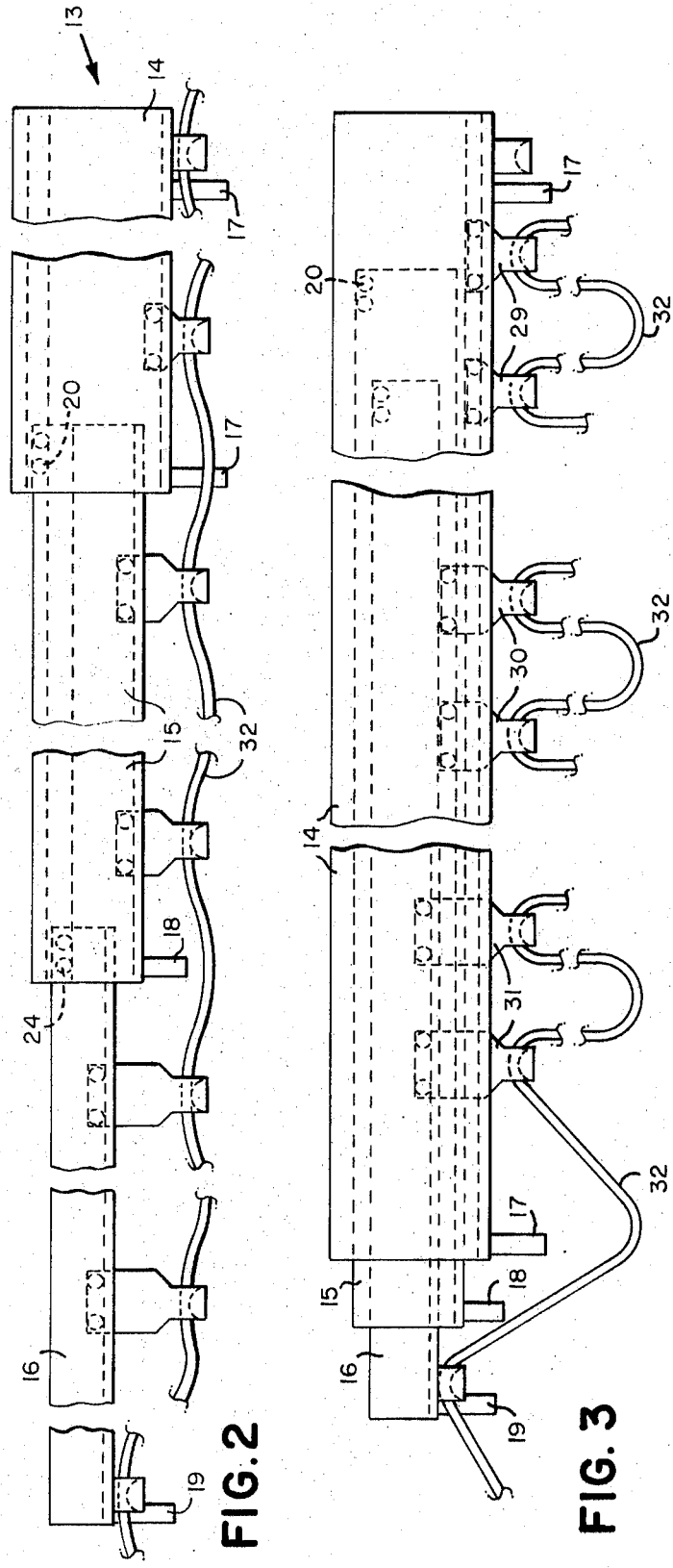

TELESCOPING POWER SUPPORT

DESCRIPTION OF THE INVENTION

This invention relates to an apparatus for supporting an electric cable or hose along an extendable structure such as a walkway leading to a parked aircraft from an airport terminal building.

An object of this invention is to provide an improved apparatus for supporting electric cable or hose along an extendable structure.

Another object of this invention is to provide an improved apparatus for supporting an extendable electric cable or hose in both its extended or gathered positions, said apparatus being constructed so that its parts telescope into each other and said parts support the cable or hose suspended therefrom by a plurality of movable and spaced trolleys.

Still another object of this invention is to provide an apparatus for supporting an electric cable or hose along an extendable structure such as a walkway provided between a parked aircraft and an airport terminal building, said walkway having a plurality of telescoping sections and said cable or hose support being provided with extendable means attached to the outside of the extendable structure so that it collapses when the extendable structure sections are telescoped and said cable or hose supporting apparatus gather the cable or hose along the outside of the telescoped structure.

Other and further objects of this invention will be apparent to those skilled in the art to which it relates from the following specification, claims and drawing.

In accordance with this invention, I have provided an electric cable or hose support structure that may be efficiently and economically manufactured and is suitable for supporting the electric cable or hose along the outside of telescoping structure such as is used as a walkway between a parked aircraft and the airport terminal building. The cable support provided in this invention is constructed so that it is extendable simultaneously as the walkway is extended or it is retracted at the same time as the walkway sections are telescoped and withdrawn from the aircraft toward the airport terminal building. The cable is supported by a plurality of spaced trolleys which are suspended from the supporting structure and which are slidable on the supporting structure so that when the cable is extended these trolleys move on the supporting structure and support the cable at spaced points. Likewise, when the supporting structure is moved during the telescoping of the walkway sections these supporting trolleys move on the supporting structure and are instrumental in supporting the cable in a serpentine configuration along the outside of the telescoped walkway.

Further features and details of this invention will be set forth in the following specification, claims and drawing in which, briefly:

FIG. 1 is a side view partially broken away of an embodiment of this electric cable or hose support shown attached to the side of an extendable structure, said structure being shown in extended position;

FIG. 2 is an enlarged view partially broken away of the cable or hose support shown in FIG. 1;

FIG. 3 is a view of the cable or hose support shown in FIG. 2 with the cable support parts telescoped;

FIG. 4 is an end view of the apparatus shown in FIG. 3;

FIG. 5 is a side view of an extendable structure such as a walkway provided to airports between the terminal building and a parked aircraft, said structure being provided with a tag line for supporting the electric cable or hose and the tag line being provided with an automatically controlled tension and reeling device;

FIG. 6 is a detail view of the automatically controlled tension and reeling device provided to the tag line which supports the electric cable or hose;

FIG. 7 is a sectional view taken along the line 7—7 of FIG. 6; and

FIG. 8 is a schematic wiring diagram of the control circuit provided to the device shown in FIG. 6.

Referring to the drawing in detail, reference numeral 10 designates a telescoping structure of conventional construction which is used between the airport building 11 and the aircraft 12 to provide a tunnel in which the aircraft passengers walk to or from the aircraft and building. The structure 10 comprises three telescoping sections 10a, 10b and 10c. The section 10a is mounted on a suitable carriage 10d by means of which this section is moved toward the aircraft or away therefrom. When the structure is contracted the section 10a telescopes over the section 10b and section 10b telescopes over the section 10c and the telescoped sections are moved toward the building 11.

The side of the structure 10 is provided with a telescoping cable support 13 such as shown in FIGS. 2 and 3. This telescoping cable support is provided with channel members 14, 15 and 16 which are attached to the sides of sections 10a, 10b and 10c respectively of the structure 10 by the brackets 17, 18 and 19, respectively. Channel member 14 is made large enough so that the channel member 15 is slidable thereinto and likewise channel member 15 is made large enough to receive channel member 16 which is slidable into member 15. When this cable support is collapsed as shown in FIG. 3 that is when the structure section 10a is moved by the carriage 10d toward the building 11 and the structure sections 10b and 10c are telescoped into section 10a.

Both ends of channel member 14 are fixedly attached to the side of structure 10a by means of brackets 17. However, only the outer ends of channel members 15 and 16 are supported by brackets 18 and 19, respectively, on the structure sections 10b and 10c, respectively. The inner end of channel member 15 is provided with two sets of rollers 20 and 21 which ride on track surfaces 22 and 23 respectively provided in channel member 14. Channel member 16 is provided with an upwardly extending rib 16a and two sets of rollers 24 and 25 are provided to the inner end of this rib. Channel member 15 is provided with inwardly extending projections 15a and 15b which form tracks for the rollers 24 and 25 respectively of channel member 16.

Channel members 14, 15 and 16 are provided with additional tracks 26, 27 and 28, respectively, for supporting the trolleys 29, 30 and 31, respectively. While only two of each of the trolleys 29, 30 and 31 are illustrated in the drawing it will be understood that as many of each of these trolleys as is desired may be provided for supporting the cable 32 on this cable support. The trolleys 29, 30 and 31 are provided with rollers 33, 34 and 35, respectively, which rise on the tracks 26, 27 and 28, respectively, of the channel members. These rollers are attached to the depending members 29, 30 and 31 of the trolleys and the bottom parts of these depending members are provided with arcuate portions over which the cable 32 is draped when the channel members are telescoped together. When the channel members are extended these arcuate surfaces support the cable 32 in more or less horizontal position as shown in FIGS. 1 and 2. The cable 32 is connected to a suitable source of current supply provided in the airport building 11 and the outer end of this cable is attached to a boom 32a that is attached to the aircraft 12 for supplying electric current thereto. On the other hand a hose may be supported by the channel members instead of or in addition to the cable 32.

In FIGS. 5 and 6 there is shown a modified embodiment of this invention in which the electric cable 32b is supported on the side of the telescoping structure 10 by means of a tag line or rope 36 the outer end of which is attached to 36a to the front end of the structure section 10a. The other end of the tag line is attached to the reel 37 shown in FIG. 6 which is provided in the housing 38 of the cable winding mechanism. The housing 38 is attached to the structure section 10c adjacent to the airport building 11. The reel 37, gear box 39 and driving motor 40 are all supported on the panel 41 which is slidable up and down on the guide rods 42 that are attached to the top and bottom of the housing 38. The upper end of the coil spring 33 is attached to the bottom part of the panel 41 and the lower end of this coil spring is attached to the bottom of the housing 38. Spring 33 is provided in cases where the weight of devices supported by panel 41 is insufficient to exert the desired tension on tag line 36. A dash pot 44 is provided with a conventional cylinder that is supported on the bottom of the housing 38 and it is also provided with a piston inside of the cylinder connected to the piston rod 44a which is adapted to engage the bottom of the panel 41 to absorb shock if the panel 41 drops down too rapidly.

The device shown in FIG. 6 is an automatic tensioning device for applying tension to the cable 36. With panel 41 positioned as shown in FIG. 6 the electric clutch 40a is energized and the system is at rest with the tension the cable 36 equal to the weight of the electric cable or hose 32b and the pulley or trolley assembly 32c. As force is applied to the telescoping structure 10 and the telescoping sections 10a, 10b and 10c are moved apart, that is toward the aircraft 12, the tag line 36 is also pulled to the right. The mounting panel 41 is raised on the guide rods 42 until the panel strikes the limit switch 45 which interrupts the electric current to the electric clutch 40a. Electric device 40a is a conventional electric clutch and brake which connects the shaft of the reel 37 to the reduction gear 39. Thus when the clutch 40a is de-energized reel 37 may be rotated against a certain amount of friction so that the cable 36 is unwound from the reel and is under predetermined tension to prevent it from sagging to an excessive extent. The reel 37 continues to unwind the cable as long as the panel 41 maintains switch 45 in open position. When the panel 41 descends enough to clear the limit switch 45 the electric clutch 40a is energized and the reel is locked with the system at rest. When the telescoping structure 10 is moved to the left, that is when it is collapsed toward the airport building 11, panel 41 is allowed to descend until it engages and closes the limit switch 46. The motor 40 then winds up the tag line 36 on the reel 37 and continues its winding operation for a sufficient length of time after the structure 10 is telescoped so that the panel 41 is lifted away from the limit switch 46. The limit switch 46 is opened and shuts off the motor 40. Clutch 40a remains activated through switch 45 and the system comes to rest.

Spring 43 is provided if more tension is required on the tag line 36. Also the dash pot 44 may be provided to prevent rapid drop of the mounting panel when limit switch 45 is tripped.

While I have shown and described a preferred embodiment of the invention, it is apparent that the invention is capable of variation and modification from the form shown so that the scope thereof should be limited only by the scope of the claims appended hereto.

What I claim is:

1. Apparatus for supporting an electric cable or hose along an extendable structure leading to a parked aircraft from an airport terminal building, the combination comprising an extendable cable support attached to the outside of the structure, said cable support being extended when the structure is extended, a plurality of depending trolleys movable on said support, said cable support comprising a plurality of telescoping channel members, each of said channel members having track means for supporting said depending trolleys, the outer one of said telescoping channel members having additional track means, means attached to an inner one of said telescoping members movably engaging said additional track means of said outer one of said telescoping members for supporting said inner one of said telescoping members, said inner one of said telescoping members having additional track means and means attached to the innermost one of said telescoping members for movably supporting said innermost one of said telescoping members on said last mentioned additional track means.

2. Apparatus for supporting an electric cable or hose as set forth in claim 1 further characterized in that said telescoping channel members are attached to the outside of said extendable structure by brackets attached to the outer ends of said channel members to hold said channel members parallel to each other and to said extendable structure.

3. Apparatus for supporting an electric cable or hose as set forth in claim 2 further characterized in that said brackets hold the ends of said outer one of said channel members fixed on said extendable structure, said brackets also holding the outer ends of said inner channel members fixed on said extendable structure and means on the other ends of said channel members slidable selected ones of said additional track means.

4. Apparatus for supporting an electric cable or hose as set forth in claim 1 further characterized in that said depending trolleys are attached to spaced points of the cable supported thereby so that said cable assumes a serpentine configuration when said telescoping members are collapsed.

5. Apparatus for supporting an electric cable or hose along an extendable structure leading to a parked aircraft from an airport building, said structure having a fixed section and at least one movable section, the combination comprising a tag line having one end attached to the movable section of the extendable structure, a plurality of movable trolleys supported in spaced relation by said tag line, different ones of said trolleys having means attached to spaced points of the cable for supporting said cable under said tag line, tensioning means for said tag line attached to the fixed section of said structure, said tensioning means having a reel and the other end of said tag line being attached to said reel, and means automatically controlling said reel to provide predetermined tension to said tag line.

6. Apparatus for supporting an electric cable or hose as set forth in claim 5 further characterized in that said reel is driven by a motor, said reel being connected to said motor by said automatic controlling means.

7. Apparatus for supporting an electric cable or hose as set forth in claim 6, further characterized in that said controlling means comprises an electric clutch, said reel, clutch and motor being mounted on a movable panel which is movable by said tag line, a limit switch controlling electric current to said clutch, said limit switch being opened when said panel is moved in one direction so that said clutch is de-energized to thereafter function as a brake to control rotation of said reel and apply predetermined tension to said tag line.

8. Apparatus for supporting an electric cable or hose as set forth in claim 7 further characterized in that there is provided a second limit switch which connects said motor to an electric current supply when said panel is moved in the opposite direction so that said motor drives said reel to take up said tag line.

* * * * *